(12) United States Patent
Cho et al.

(10) Patent No.: US 11,889,333 B2
(45) Date of Patent: Jan. 30, 2024

(54) DISTRIBUTED ANTENNA MONITORING APPARATUS USED FOR PUBLIC SAFETY RADIO NETWORK, AND METHOD THEREFOR

(71) Applicant: Innertron, Inc., Incheon (KR)

(72) Inventors: Hak Rae Cho, Incheon (KR); Chang Hyun Lee, Incheon (KR); Hyu Jin Jung, Incheon (KR); Tae Wan Jeong, Incheon (KR)

(73) Assignee: INNERTRON, INC., Incheon (KR)

( * ) Notice: Subject to any disclaimer, the term of this patent is extended or adjusted under 35 U.S.C. 154(b) by 229 days.

(21) Appl. No.: 17/482,554

(22) Filed: Sep. 23, 2021

(65) Prior Publication Data
US 2022/0338036 A1 Oct. 20, 2022

(30) Foreign Application Priority Data
Apr. 20, 2021 (KR) .......................... 10-2021-0050973

(51) Int. Cl.
*H04B 17/318* (2015.01)
*H04W 24/08* (2009.01)
(Continued)

(52) U.S. Cl.
CPC ............ *H04W 24/08* (2013.01); *H04B 7/026* (2013.01); *H04B 7/155* (2013.01); *H04B 17/318* (2015.01)

(58) Field of Classification Search
CPC .. H04B 7/022; H04B 7/024; H04B 10/25754; H04B 10/25758; H04B 17/318; H04B 17/336; H04W 52/42; H04W 88/085
(Continued)

(56) References Cited

U.S. PATENT DOCUMENTS

| 2011/0244914 A1* | 10/2011 | Venkatraman | ........ | H04W 52/42 455/522 |
| 2012/0134673 A1* | 5/2012 | Palanisamy | ...... | H04B 10/25758 398/58 |
| 2017/0359104 A1* | 12/2017 | Pan | ...................... | H04B 17/318 |

* cited by examiner

Primary Examiner — Harun Chowdhury
(74) Attorney, Agent, or Firm — LEX IP MEISTER, PLLC

(57) ABSTRACT

The present disclosure relates to a distributed antenna monitoring apparatus for monitoring antennas of a distributed antenna system (DAS) installed in a building in a public safety radio network, and a method therefor. The distributed antenna monitoring apparatus disclosed herein includes: a radio coupler configured to couple a monitoring radio signal to be transmitted and received to and from distributed service antennas; a master unit configured to transmit the monitoring radio signal having a diagnostic packet included therein to the distributed service antennas through the radio coupler, and receive a monitoring radio signal having a response packet included therein from each of the distributed service antennas to measure a received signal strength indication for uplink (RSSI_U), analyze the measured received signal strength indication for uplink (RSSI_U) and a received signal strength indication for downlink (RSSI_D) to monitor a state of each of the distributed service antennas; and a plurality of remote units respectively connected to the distributed service antennas through radio links, and each configured to receive the monitoring radio signal having the diagnostic packet included therein transmitted from the master unit to measure the received signal strength indication for downlink (RSSI_D), assemble the response packet having the measured received signal strength indication for downlink (RSSI_D) and transmit the monitoring radio signal having the assembled response packet to the master unit.

7 Claims, 8 Drawing Sheets

(51) Int. Cl.
*H04B 7/155* (2006.01)
*H04B 7/026* (2017.01)

(58) Field of Classification Search
USPC .......................... 370/315, 328, 329; 455/522
See application file for complete search history.

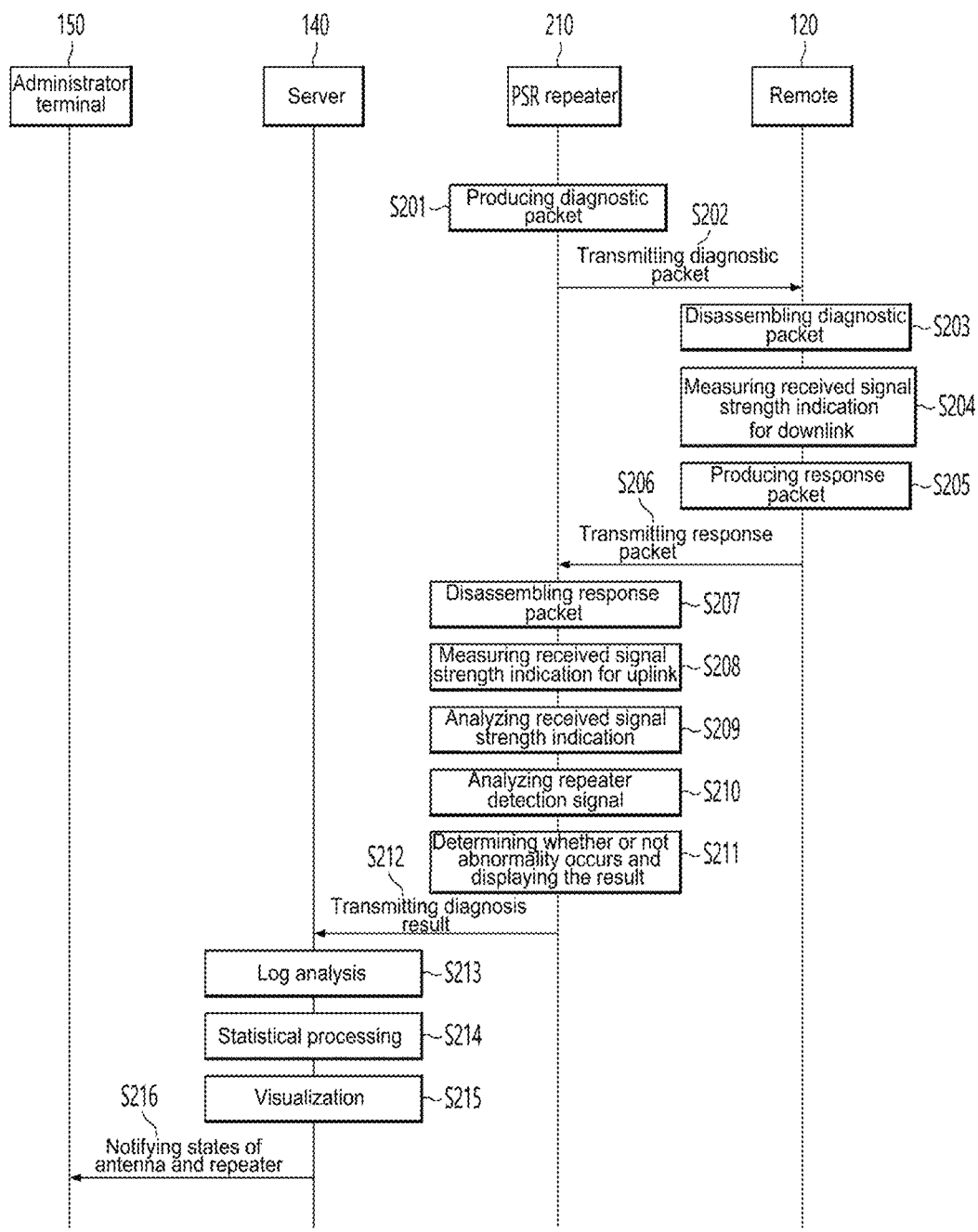

DISTRIBUTED ANTENNA MONITORING APPARATUS USED FOR PUBLIC SAFETY RADIO NETWORK, AND METHOD THEREFOR

CROSS-REFERENCE TO RELATED APPLICATION

This application claims priority to and the benefit of Korean Patent Application No. 10-2021-0050973 filed in the Korean Intellectual Property Office on Apr. 20, 2021, the entire contents of which are incorporated herein by reference.

TECHNICAL FIELD

The present disclosure relates to an antenna monitoring apparatus and a method therefor, and more particularly relates to a distributed antenna monitoring apparatus for monitoring antennas of a distributed antenna system (DAS) installed in a building in a public safety radio network, and a method therefor.

BACKGROUND

In general, it may be difficult for an external radio signal to directly reach inside of a building or subway. Thus, the inside of a building or subway can be classified as a shadow zone where radio communication with a terminal inside a building or subway is difficult. Typically, repeaters are used for radio communication in shadow zones. In particular, in a large building having multiple floors or an underground space partitioned by various types of structures, a distributed antenna system (DAS) in which a plurality of antennas are installed for each of the floors or the partitioned spaces, is connected to a repeater, and then communicates with external devices.

The public safety radio network or disaster safety communication network is an emergency communication network for protecting and rescuing peoples when an emergency such as fire occurs in a large building or structure, a subway, a ship, or the like so that the owners of buildings in the United States of America are obliged to install an emergency radio responder communication system (ERRCS) in the building.

FIG. 1 is a schematic view illustrating an overall configuration of a typical public safety radio network.

As illustrated in FIG. 1, the public safety radio network may include a local public safety tower 10 equipped with a first responder antenna that is provided outside a building B, a donor antenna 20 installed on the roof, the rooftop, or the like of the building B and having a directivity to the local public safety tower 10, a signal repeating device 30, a radio frequency (RF) distributor 35, and a plurality of distributed service antennas 40-1 to 40-N dispersedly installed on each floor in the building B.

Referring to FIG. 1, the donor antenna 20 is a directional antenna which is installed on the roof or the like of the building B to be able to communicate with the external local public safety tower 10. The signal repeating device 30 performs a low-noise amplification and frequency up-down conversion on a radio signal received from the donor antenna 20, amplifies the signal to a high-power level, and then transmits the signal to the plurality of distributed service antennas 40-1 to 40-N. Further, the signal repeating device 30 performs a low-noise amplification and frequency up-down conversion on radio signals received from the plurality of distributed service antennas 40-1 to 40-N, amplifies the signals to a high-power level, and then transmits the signals to the donor antenna 20. The RF distributor 35 distributes the radio signal from the signal repeating device 30 to the plurality of distributed service antennas 40-1 to 40-N. Further, the RF distributor 35 combines the radio signals received from the plurality of distributed service antennas 40-1 to 40-N and transmits the same to the signal repeating device 30. The plurality of distributed service antennas 40-1 to 40-N constitutes a distributed antenna system (DAS) composed of omnidirectional antennas that are dispersed in each floor in the building B, form radio links with respect to a radio terminal 50-2 located inside the building B, and enables the radio terminal 50-2 to communicate with an emergency control center or a terminal 50-1 of an emergency controller through the local public safety tower 10 located outside the building B.

The state of the public safety radio network needs to be monitored at ordinary times to ensure stable communication with the public safety radio network at an emergency situation such as the occurrence of a fire. An antenna monitoring apparatus capable of monitoring operating states of antennas dispersed throughout the building at ordinary times needs to be installed.

A technique of measuring characteristics of an antenna is required for monitoring the antenna. As a method of measuring characteristics of an antenna, various measurement methods, such as a Voltage Standing Wave Ration (VSWR) measurement method, a Radio Frequency (RF) modem, a Radio Frequency IDentification (RFID), a Bluetooth Low Energy (BLE) have been known. The VSWR measurement method, which is most commonly used, is a method of transmitting a carrier frequency to an antenna and measuring a signal reflected from the antenna. However, this method may be difficult to apply to the distributed antenna system (DAS) in which a single output is linked to a plurality of antennas.

Thus, various methods are being attempted to monitor characteristics of the antennas of the DAS. However, the RF modem-based measurement method may cause a large amount of power consumption, the RFID-based measurement method may have a limited measurement range, and the BLE-based measurement method may have a limited number of monitoring nodes. That is, when the number of antennas to be monitored is large, the conventional antenna characteristic measurement methods may cause problems such as data interference or data traffic due to the limitation of the number of communication nodes. In addition, in the conventional method, a signal sensitivity degrades due to multiple paths and measurement is performed in a simplex communication, which may deteriorate the measurement accuracy. Further, when a difference between a frequency band used in the public safety radio network (PSR) and a frequency band used in the conventional method increases, it may be difficult to accurately receive an antenna signal, which may induce erroneous determining of the state of the antenna.

SUMMARY

The present disclosure is made to solve these problems in the related art, and an object of the present disclosure is to provide a distributed antenna monitoring apparatus for accurately monitoring states of antennas of a distributed antenna system (DAS) installed inside a building in a public safety radio network, and a method therefor.

An embodiment of the present disclosure discloses a distributed antenna monitoring apparatus used for a public safety radio network.

The distributed antenna monitoring apparatus disclosed herein is used in the public safety radio network including: a plurality of distributed service antennas dispersed in each floor in a building; a repeater for public safety radio network connected to a donor antenna through a coaxial cable, and configured to transmit a monitoring radio signal received from the donor antenna to the plurality of distributed service antennas and transmit monitoring radio signals received from the plurality of distributed service antennas to the donor antenna; and a radio frequency distributor connected between the repeater and the plurality of distributed service antennas through coaxial cables, and configured to distribute the radio signal transmitted from the repeater to the plurality of distributed service antennas, and combine the monitoring radio signals received from the plurality of distributed service antennas and transmit the combined radio signal to the repeater. The distributed antenna monitoring apparatus includes: a radio coupler configured to couple the monitoring radio signal to be transmitted and received to and from the plurality of distributed service antennas; a master unit configured to transmit the monitoring radio signal having a diagnostic packet included therein to the plurality of distributed service antennas through the radio coupler, and receive the monitoring radio signal having a response packet included therein from each of the plurality of distributed service antennas to measure a received signal strength indication for uplink (RSSI_U), analyze the measured received signal strength indication for uplink (RSSI_U) and a received signal strength indication for downlink (RSSI_D) to monitor a state of each of the plurality of distributed service antennas; a plurality of remote units respectively connected to the plurality of distributed service antennas through radio links, and each configured to receive the monitoring radio signal having the diagnostic packet included therein transmitted from the master unit to measure the received signal strength indication for downlink (RSSI_D), assemble the response packet having the measured received signal strength indication for downlink (RSSI_D) and transmit the monitoring radio signal having the assembled response packet to the master unit; and a monitoring server connected to the master unit though a communication network and configured to perform a statistical processing and visualization on information about the state of each of the plurality of distributed service antennas such that the information is monitored on an administrator terminal.

The radio coupler and the master unit may be incorporated in the repeater for the public safety radio network to simultaneously monitor the state of each of the plurality of distributed service antennas and a state of the repeater.

The master unit may include: an Ethernet driver configured to communicate with the monitoring server in a TCP/IP manner; a master control part configured to produce a diagnostic payload, analyze a response payload to determine whether or not an abnormality occurs, and transmit antenna monitoring information to the monitoring server through the Ethernet driver; a protocol processor configured to assemble the diagnostic payload in the diagnostic packet corresponding to a communication protocol, and disassemble the response packet to extract the response payload therefrom under a control of the master control part; a radio frequency module configured to transmit the diagnostic packet as the monitoring radio signal and extract the response packet from the monitoring radio signal input thereto; and a radio frequency splitter configured to separate or combine the monitoring radio signals.

The remote unit may include: a radio frequency module configured to receive the monitoring radio signal to extract the diagnostic packet from the monitoring radio signal, and transmit the monitoring radio signals having the response packets included therein; a protocol processor configured to disassemble the diagnostic packet to extract the diagnostic payload therefrom, and assemble the response payload in the response packet corresponding to a communication protocol; a remote control part configured to analyze the diagnostic payload to measure the received signal strength indication for downlink (RSSI_D), produce the response payload having the received signal strength indication for downlink (RSSI_D) and transmit the produced response payload to the protocol processor; and a power source configured to supply power required for the remote unit.

Another embodiment of the present disclosure discloses a distributed antenna monitoring method used in a public safety radio network.

The distributed antenna monitoring method disclosed herein includes: producing and transmitting, by a master unit, a diagnostic packet to a remote unit; disassembling and analyzing, by the remote unit, the diagnostic packet to measure a received signal strength indication for downlink (RSSI_D); producing, by the remote unit, a response packet having the received signal strength indication for downlink (RSSI_D); transmitting, by the remote unit, the response packet to the master unit through a service antenna of distributed service antennas; disassembling, by the master unit, the response packet to measure a received signal strength indication for uplink (RSSI_D); analyzing, by the master unit, the received signal strength indication for downlink (RSSI_D) and a received signal strength indication for uplink (RSSI_U) to determine whether or not an abnormality occurs in each of the distributed service antennas; transmitting, by the master unit, an antenna diagnosis result to a monitoring server; and allowing the monitoring server to perform a statistical processing and visualization on antenna diagnosis information and to notify an administrator of the antenna diagnosis information.

A distributed antenna monitoring apparatus according to an embodiment of the present disclosure is capable of operating several thousands of nodes using a communication method in which a radio frequency (RF) transceiver is used, which makes it capable of controlling radio communication without causing data interference even with increased number of antennas to improve signal sensitivity even in multiple paths. It is capable of performing bidirectional communication to measure signals on both paths of transmission and reception. Thus, the distributed antenna monitoring apparatus can obtain more accurate measurement results.

Furthermore, according to embodiments of the present disclosure, by using a frequency in the frequency band of 850 to 1,050 MHz, which is close to a frequency used in a public safety radio network (PSR), it is possible to minimize a reduction in antenna gain. Moreover, it is possible to reduce the size of a terminal and manufacturing cost thereof, which reduces power consumption at maximum.

BRIEF DESCRIPTION OF THE DRAWINGS

FIG. 6A is a view illustrating a LoRa protocol stack, FIG. 6B is a communication timing diagram of Class A, and FIG. 6C is an example illustrating a packet structure of a physical layer.

FIG. 9 is a flowchart for explaining an operation procedure of the distributed antenna monitoring apparatus for public safety radio network according to the second embodiment of the present disclosure.

DETAILED DESCRIPTION

The present disclosure and technical problems to be solved by the carrying-out of the present disclosure will become more apparent by the preferred embodiments of the present disclosure which will be described later. The following embodiments will be merely described to explain the present disclosure, and are not intended to limit the scope of the present disclosure.

Figure 1:
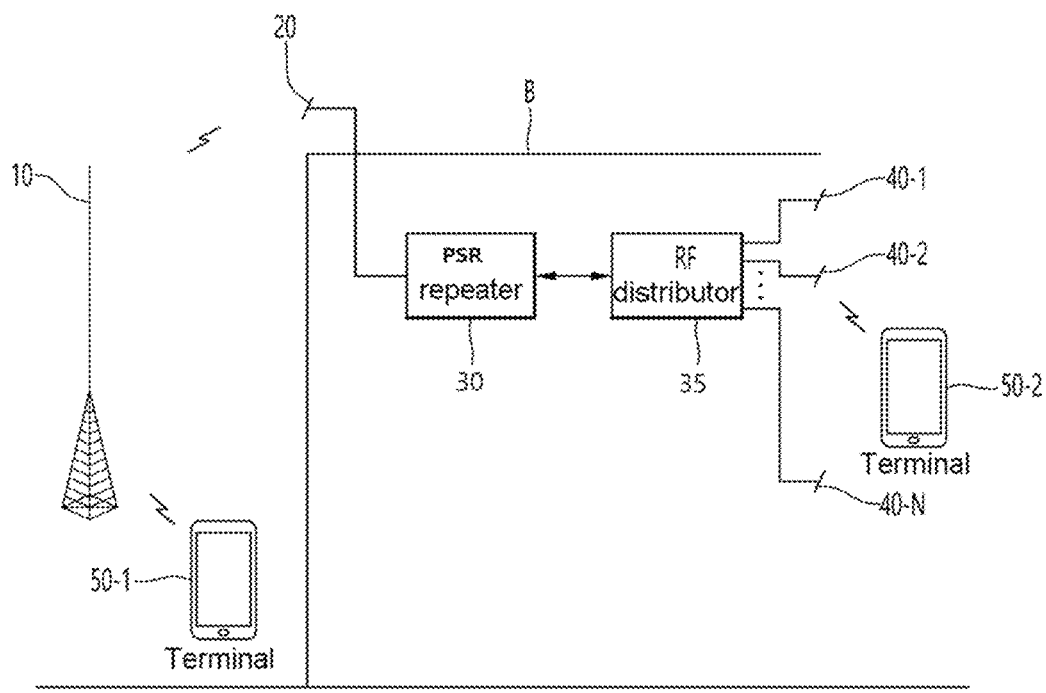
FIG. 1 is a schematic view illustrating an example of a typical public safety radio network.
Figure 2:
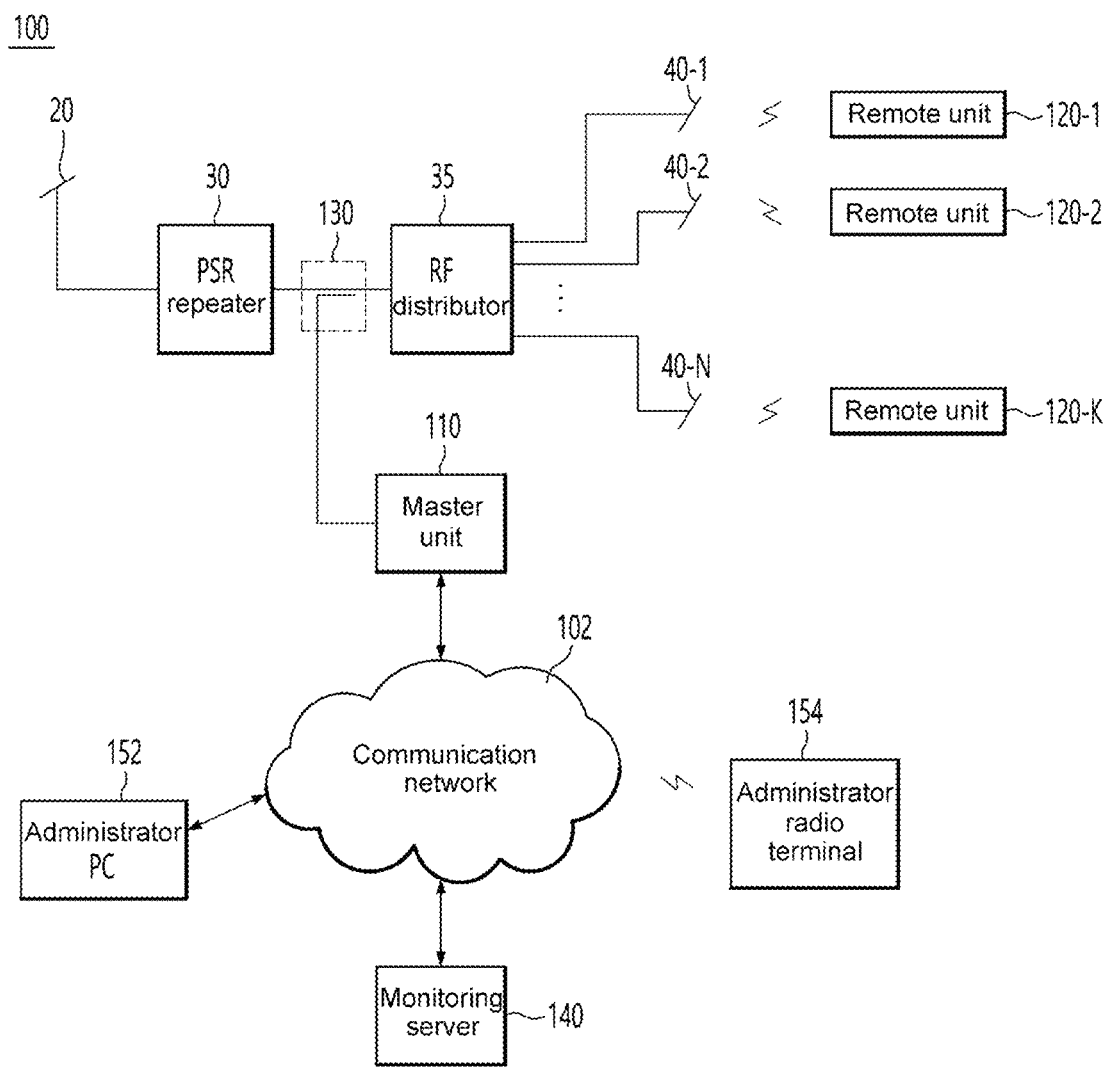
FIG. 2 is a schematic view illustrating an overall configuration of a distributed antenna monitoring apparatus for public safety radio network according to a first embodiment of the present disclosure.
Figure 3:
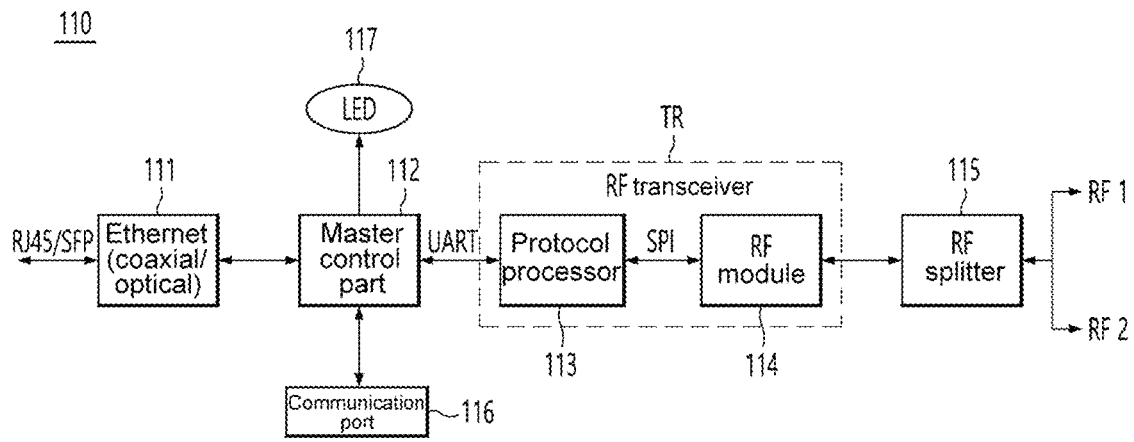
FIG. 3 is a block diagram illustrating a configuration of a master unit illustrated in FIG. 2.
Figure 4:
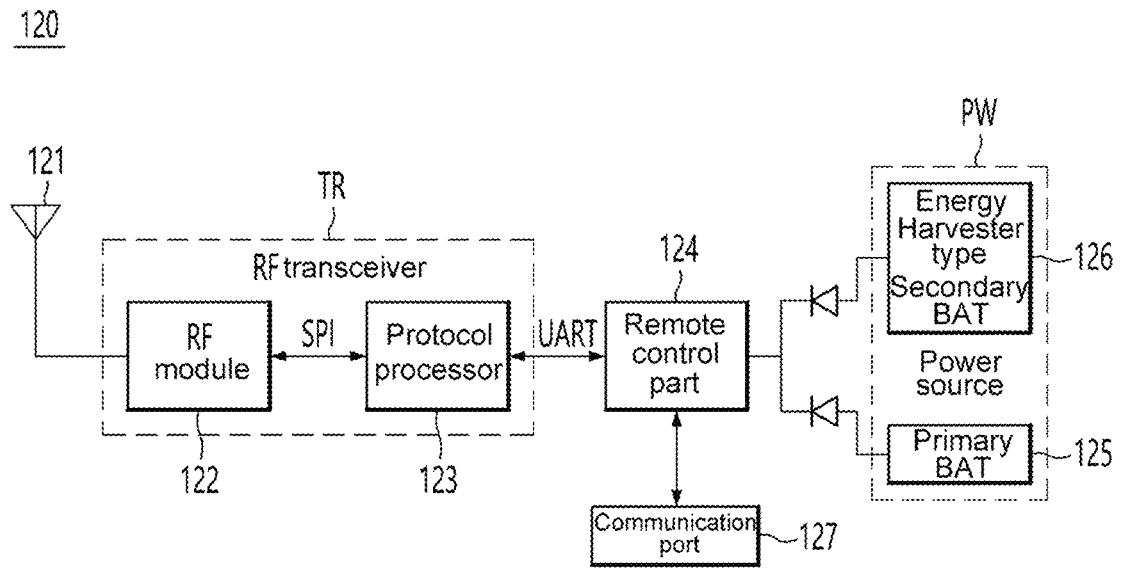
FIG. 4 is a block diagram illustrating a configuration of a remote unit illustrated in FIG. 2.

FIG. 2 is a schematic view illustrating an overall configuration of a distributed antenna monitoring apparatus for public safety radio network according to a first embodiment of the present disclosure. FIG. 3 is a block diagram illustrating a configuration of a master unit illustrated in FIG. 2. FIG. 4 is a block diagram illustrating a configuration of a remote unit illustrated in FIG. 2.

As illustrated in FIG. 2, a distributed antenna monitoring apparatus 100 according to the first embodiment of the present disclosure includes a donor antenna 20, a public safety radio (PSR) repeater 30, a radio frequency (RF) distributor 35, a master unit 110 connected to a distributed antennas system (DAS) for public safety radio network in which distributed service antennas 40-1 and 40-2 are provided through a radio coupler 130, and remote units 120-1 to 120-N (collectively referred to sometimes as a remote unit 120) connected to the distributed service antennas 40-1 to 40-N by radio links, respectively, a monitoring server 140 connected to the master unit 110 through a communication network 102, an administrator personal computer (PC) 152, and an administrator radio terminal 154. The administrator PC 152 and the administrator radio terminal 154 will be collectively referred to sometimes as an administrator radio terminal 150.

Referring to FIG. 2, the donor antenna 20 is a directional antenna connected to an external radio network. The PSR repeater 30, which is connected to the donor antenna 20 by a coaxial cable, transmits a radio signal received from the donor antenna 20 to the distributed service antennas 40-1 to 40-N, and transmits radio signals received from the distributed service antennas 40-1 to 40-N to the donor antenna 20.

The RF distributor 35, which is connected between the PSR repeater 30 and the distributed service antennas 40-1 to 40-N by coaxial cables, distributes and delivers the radio signal transmitted from the PSR repeater 30 to the distributed service antennas 40-1 to 40-N, and combines the radio signals received from distributed the service antennas 40-1 to 40-N and transmits the same to the PSR repeater 30.

The distributed service antennas 40-1 to 40-N, which are omnidirectional antennas that are dispersedly installed in each floor in a building, transmit radio signals received from the master unit 110 to the remote units 120-1 to 120-K, and transmit the radio signals received from the remote units 120-1 to 120-K to the master unit 110 through the RF distributor 35 and the radio coupler 130. At this time, both a radio signal for servicing communication based on the public safety radio network and a monitoring radio signal for monitoring the distributed service antennas 40-1 to 40-N according to an embodiment of the present disclosure, are transmitted to the RF distributor 35 and the distributed service antennas 40-1 to 40-N.

In FIG. 2, the distributed service antennas 40-1 to 40-N and the remote units 120-1 to 120-K are illustrated to be matched in a one-to-one relationship with each other (namely, K=N). In some embodiments, remote units 120-1 to 120-K may be installed for each floor so as to simultaneously monitor the plurality of distributed service antennas.

The radio coupler 130, which is installed in a transmission line between the PSR repeater 30 and the RF distributor 35, couples a monitoring radio signal and transmits the same to the master unit 110. The master unit 110 transmits the monitoring radio signal having a diagnostic packet included therein to the distributed service antennas 40-1 to 40-N through the radio coupler 130 and receives a monitoring radio signal having a response packet included therein, which is received from each of the distributed service antennas 40-1 to 40-N. Subsequently, the master unit 110 compares and analyzes a signal strength indication for uplink (RSSI_U) and a signal strength indication for downlink (RSSI_D) to monitor the states of the distributed service antennas 40-1 to 40-N.

The remote units 120-1 to 120-N, which are respectively connected to the distributed service antennas 40-1 to 40-N through radio links, receive the monitoring radio signal having the diagnostic packet included therein transmitted from the master unit 110 to measure the signal strength indication for downlink (RSSI_D). Thereafter, the remote units 120-1 to 120-N assemble the response packet including the measured signal strength indication for downlink (RSSI_D) and transmit the same to the master unit 110.

In an embodiment of the present disclosure, a long range (LoRa) protocol (to be described in detail later) may be applied as a communication protocol between the master unit 110 and the remote units 120-1 to 120-K.

The monitoring server 140 is connected to the master unit 110 though the communication network 102 and performs a statistical processing and visualization on the state information of the distributed service antennas, which is collected from a remote place, to be monitored on the administrator PC 152 and the administrator radio terminal 154. In this case, the monitoring server 140 provides a graphic user interface (GUI) to which the standard HTML5 is applied. Thus, the same interface may be provided on a Web browser of the administrator PC 152 or the administrator radio terminal 154 such as a smartphone without having to install a separate program. In particular, it is possible to support a dynamic screen configuration according to a resolution of a browser by applying an HTML5-based development platform in consideration of a mobile environment.

The administrator radio terminal 150 may include the administrator PC 152 and the administrator radio terminal 154 such as a smartphone, which are connected to the communication network 102. The communication network 102 collectively refers to a known communication network, such as a wired/wireless internet (TCP/IP) network and a mobile communication network.

As illustrated in FIG. 3, the master unit 110 includes: an Ethernet driver 111 configured to communicate with the monitoring server 140 in a TCP/IP manner; a master control part 112 configured to produce a diagnostic payload and analyze a response payload to determine whether or not an abnormality occurs and transmit antenna monitoring information to the monitoring server 140 through the Ethernet driver 111; a protocol processor 113 configured to assemble the diagnostic payload into a diagnostic packet corresponding to the communication protocol and disassemble the response packet to extract the response payload from the response packet under the control of the master control part 112; a RF module 114 configured to transmit the diagnostic packet as the monitoring radio signal and extract the response packet from the monitoring radio signal received from the protocol processor 113; and a RF splitter 115 configured to separate or combine the monitoring radio signals. The master control part 112 may be implemented by a central processing unit (CPU) and may be connected to an external host device through a communication port 116. The master control part 112 may display information related to an operation state, an abnormality state, or the like using a light emitting device (LED) 117.

Referring to FIG. 3, the master unit 110 may incorporate the RF splitter 115 therein so as to use two radio ports RF1 and RF2 at maximum with single equipment, and may include a wired Ethernet port RJ-45 and an optical Ethernet port SFP such that the collected data can be transmitted to the monitoring server 140 through the TCP/IP network.

As illustrated in FIG. 4, the remote unit 120 includes: an RF module 122 configured to transmit and receive the monitoring radio signal(s) to and from the distributed service antennas 40-1 to 40-N through an antenna 121; a protocol processor 123 configured to disassemble the diagnostic packet to extract the diagnostic payload therefrom, and assemble the response payload into the response packet corresponding to the communication protocol; a remote control part 124 configured to analyze the diagnostic payload to measure the received signal strength indication for downlink (RSSI_D), produce a response payload having the received signal strength indication for downlink (RSSI_D) included therein and transmit the same to the protocol processor 123; a primary battery 125 configured to supply required power to the remote unit 120; and a secondary battery 126 configured to be charged in an Energy Harvester manner. The remote control part 124 may be implemented by a CPU and may be connected to an external host device through a communication port 127 at an initial installation or update.

In an embodiment of the present disclosure, hardware and software of the remote unit 120 may be designed to have a low power circuit and an Energy Harvest function so that the remote unit 120 is operated for a prolonged period of time. In this embodiment, the primary battery 125 may be used as a main operation power source for the remote unit 120, and the secondary battery 126 having the Energy Harvest function may be used as an auxiliary operation power source for the remote unit 120. That is, a power source PW for the remote unit 120 is configured such that the primary battery 125 such as a dry cell is used as a primary power source and the secondary battery 126 configured to be charged by a solar cell or the like is used as an auxiliary power source so as to ensure the long-time operation.

Referring to FIGS. 3 and 4, in an embodiment of the present disclosure, an RF transceiver TR is a radio transceiver based on the LoRa communication protocol. The protocol processors 113 and 123 may be configured to process a LoRa protocol stack, and the RF modules 114 and 122 may be configured to transmit and receive radio signals based on the LoRa communication protocol.

The master control part 112 produces a "diagnostic payload" of a predetermined format for measuring the received signal strength indication for downlink RSSI_D to diagnose the transmission path of the distributed antennas monitoring apparatus, and transfers the diagnostic payload to the protocol processor 113 that processes the LoRa protocol such that the protocol processor 113 assembles the diagnostic packet including the diagnostic payload. The protocol processor 113 receives the diagnostic payload and primarily produces a diagnostic packet of a media access control (MAC) layer. Thereafter, as illustrated in FIG. 6C, the protocol processor 113 produces a diagnostic packet of a physical layer. The diagnostic packet of the physical layer is modulated with the monitoring radio signal by the RF module 114 and transmitted to the remote unit 120.

The RF module 122 of the remote unit 120 demodulates the monitoring radio signal having the diagnostic packet included therein received thereto to extract the diagnostic packet of the physical layer therefrom. The protocol processor 123 disassembles the diagnostic packet of the physical layer to extract the diagnostic packet of the MAC layer therefrom, followed by disassembling the diagnostic packet of the MAC layer to extract the "diagnostic payload" therefrom, followed by transferring the extracted diagnostic payload to the remote control part 124.

The remote control part 124 analyzes the diagnostic payload to measure the signal strength indication for downlink RSSI_D, and produces a "response payload" of a predetermined format in which the received signal strength indication for downlink and a unique identification (ID) are included. The remote control part 124 transfers the response payload to the protocol processor 123 that processes the LoRa protocol such that the protocol processor 123 assembles the response packet having the response payload. The protocol processor 123 of the remote unit 120 receives the delivered response payload and primarily produces a response packet of the MAC layer. Thereafter, as illustrated in FIG. 6C, the protocol processor 123 produces a response packet of the physical layer. The response packet of the physical layer is modulated with the monitoring radio signal by the RF module 122 and transmitted to the master unit 110.

The RF module 114 of the master unit 110 demodulates the monitoring radio signal having the response packet included therein, which is received from the remote unit 120, to extract the response packet of the physical layer therefrom. The protocol processor 113 disassembles the response packet of the physical layer to extract the response packet of the MAC layer therefrom, followed by disassembling the response packet of the MAC layer to extract the "response payload" therefrom, followed by transferring the extracted response payload to the master control part 112.

The master control part 112 analyzes the response payload to measure the received signal strength indication for uplink (RSSI_U), obtains a ratio of the received signal strength indication for downlink (RSSI_D) to the received signal strength indication for uplink (RSSI_U) included in the response payload, and compares a value of the obtained ratio with a predetermined reference value R to determine whether or not an abnormality occurs. The predetermined reference value R used to determine whether or not an abnormality occurs is obtained based on an uplink signal analyzed by the master control part 112. That is, the uplink signal transmitted from the remote unit 120 and received by the master unit 110 includes information indicating whether or not an abnormality occurs in the path from the master unit 110 to the remote unit 120 that analyzes a downlink output signal strength and the received signal strength indication for downlink (RSSI_D) transmitted from the master unit 110, and a unique ID of the remote unit 120. Further, the master control part 112 compares the received signal strength indication for uplink (RSSI_U) with an existing value (a specified value) to determine whether or not an abnormality occurs in the antennas.

Figure 5:
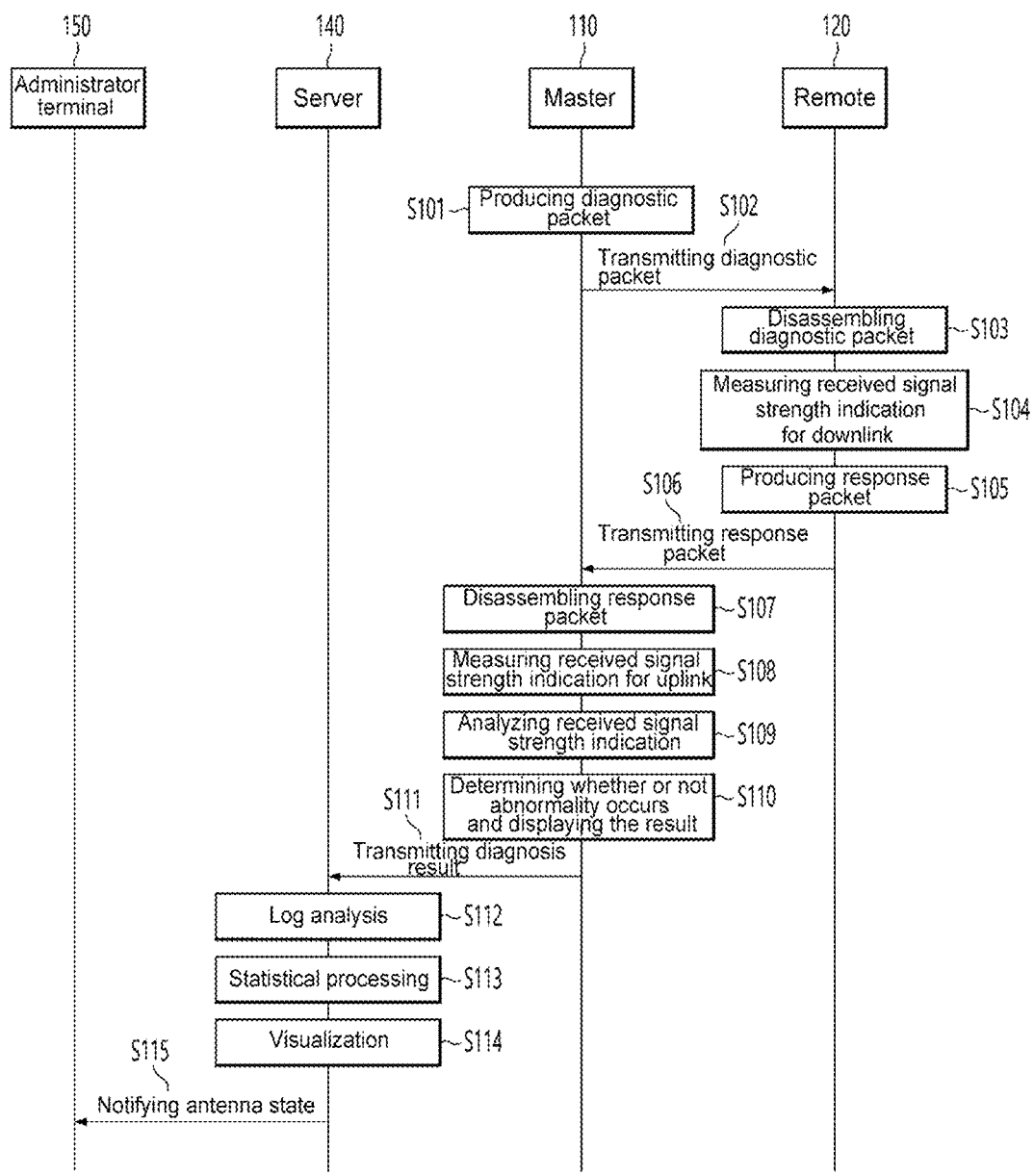
FIG. 5 is a flowchart for explaining an operation procedure of the distributed antenna monitoring apparatus for public safety radio network according to the first embodiment of the present disclosure.

FIG. 5 is a flowchart for explaining an operation procedure of a distributed antenna monitoring apparatus for public safety radio network according to a first embodiment of the present disclosure.

First, the master unit 110 and the remote unit 120 for monitoring the distributed service antennas communicate with each other based on the LoRa protocol. The Lora protocol is a kind of a low power wide area network (LPWAN) communication technology, and is designed to use a frequency band in an Industrial Scientific medical (ISM) band and be capable of operating for a prolonged period of time by a battery. In such an ISM band, one of Frequency Hopping (FH), Listen Before Talk (LBT), Duty Cycle (DC) is required to be used for common use with other radio instruments.

Figure 6A:
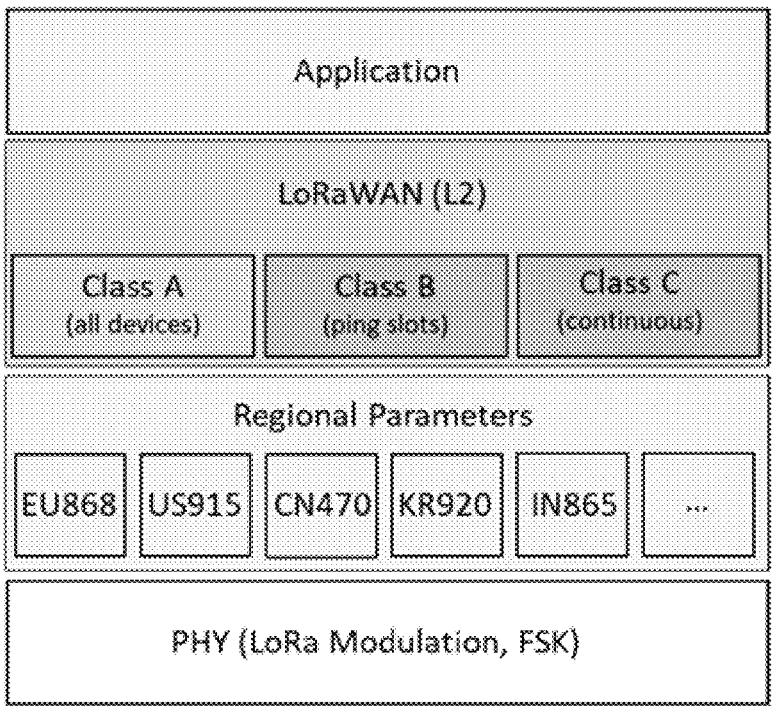
FIGS. 6A to 6C are views for explaining a LoRa protocol used in an embodiment of the present disclosure.
Figure 6B:
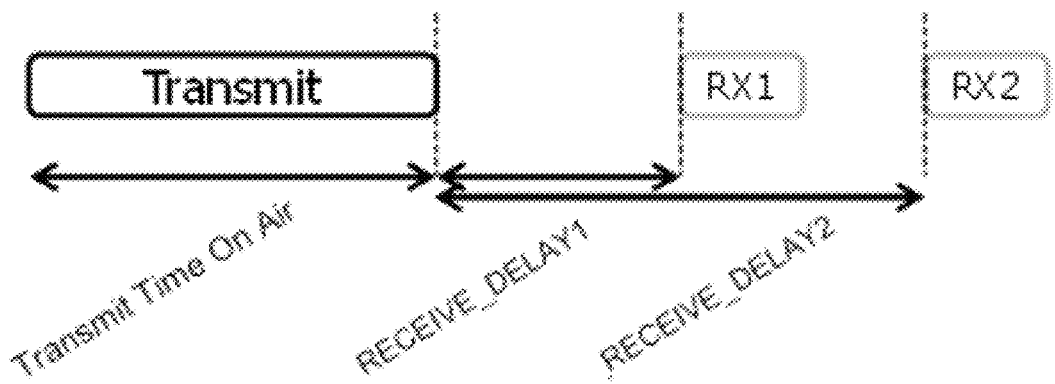
Figure 6C:
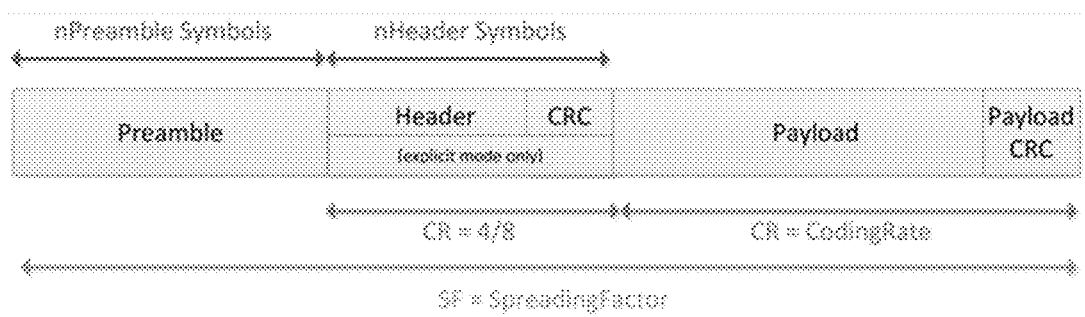

FIG. 6A is a view illustrating a LoRa protocol stack, FIG. 6B is a communication timing diagram of Class A, and FIG. 6C is an example illustrating a packet structure of a physical layer.

The LoRa protocol is composed of a physical layer L1 having regional parameters, a MAC layer L2, and an application layer L3. In an embodiment of the present disclosure, the physical layer adopts 915 MHz (US915) in the Americas, and the MAC layer adopts a communication mode of the Class A. Class A is a communication mode in which the remote unit 120 is capable of performing an uplink message transmission with respect to the master unit 110, receiving two rounds of downlink messages after waiting for a while, and then maintaining a sleeping state for the remaining time, thereby minimizing unnecessary battery consumption. Class B is a beacon mode in which a reception state is maintained at regular time intervals. Class C represents a continuously-receivable state, which causes a significant amount of battery consumption.

A data transfer rate of the LoRa protocol is defined in a range of DR0 to DR5 according to a spreading factor (SF). One of the data transfer rates DR0 to DR5 may be selectively used depending on the environment.

As illustrated in FIG. 6C, the diagnostic packet and the response packet used in the embodiment of the present disclosure has a packet structure in which an explicit header mode is included in the physical layer. A packet structure of a LoRa-based physical layer has a preamble of 8 symbols, a physical layer header, a physical layer cyclic redundancy check (CRC), a physical layer payload (PHY_Payload), and a two-byte of payload CRC (at the time of uplink). At the time of downlink, the two-byte of payload CRC is omitted.

The physical layer payload (PHY_Payload) has a MAC layer header (MHDR), a MAC layer payload (MAC_Payload) and a message integrity code (MIC). The MAC layer payload (MAC_Payload) has a frame header FHDR, an FPort, and a diagnostic payload provided from the master control part 112 or the response payload provided from the remote control part 124.

Figure 7:
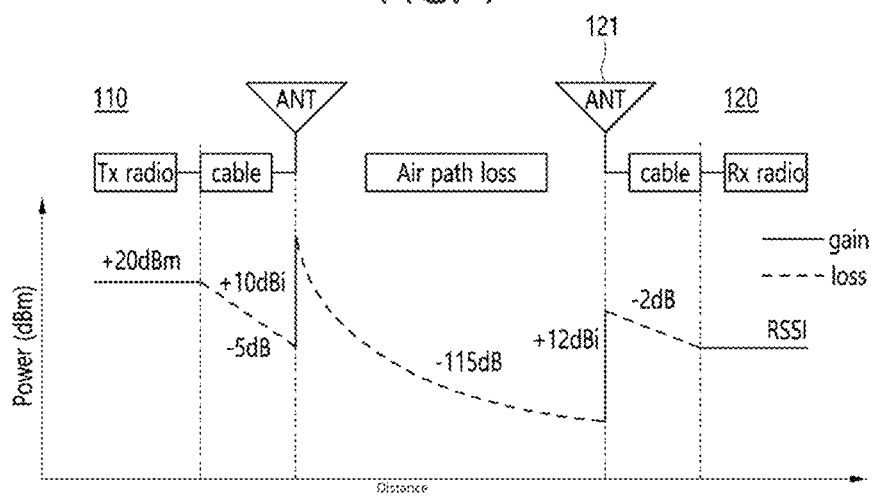
FIG. 7 is a view for explaining a received signal strength indication (RSSI) used in an embodiment of the present disclosure.

FIG. 7 is a view for explaining the received signal strength indication used in an embodiment of the present disclosure.

As illustrated in FIG. 7, in the radio link between the master unit 110 and the remote unit 120 used in the embodiment of the present disclosure, when the RF module 114 transmits a radio output of +20 dBm, the radio output is attenuated by a level of approximately −5 dB in the cable, obtains a gain of approximately 10 dBi in the service antenna, undergoes a loss of approximately 115 dB in the air, obtains a gain of 12 dBi in the antenna 121 of the remote unit 120, attenuated by a level of −2 dB in the cable, and reaches the receiver. A reception power of the radio output which has reached the receiver at that time is referred to as a received signal strength indication (RSSI).

A procedure of monitoring the distributed service antennas according to an embodiment of the present disclosure is performed by transmitting a message between the administrator radio terminal 150, the monitoring server 140, the master unit 110, and the remote unit 120, as illustrated in FIG. 5.

Referring to FIG. 5, the master unit 110 produces the diagnostic packet and transmits the same to the remote unit 120 through the radio coupler 130, the RF distributor 35 and the distributed service antennas 40-1 to 40-N (in S101 and S102).

The remote unit 120 receives the diagnostic packet, disassembles and analyzes the same to measure the received signal strength indication for downlink (RSSI_D) therefrom (in S103 and S104). The measurement of the received signal strength indication for downlink (RSSI_D) is performed as follows. The signal received at the antenna is amplified to a low-noise level by a low noise amplifier (LNA) and is input to RFI_HF in LORA. The input signal is down-converted by a mixer, and subsequently, an intermediate frequency (IF) signal is analyzed to measure the received signal strength indication for downlink (RSSI_D).

The remote unit 120 assembles the response packet having the received signal strength indication for downlink (RSSI_D), and subsequently, transmits the assembled response packet with carried in a transmission time slot to the master unit 110 through a respective one of the distributed service antennas 40-1 to 40-N, the RF distributor 35 and the radio coupler 130 (in S105 and S106).

The master unit 110 receives, disassembles, and analyzes the response packet received from the remote unit 120 to measure the received signal strength indication for uplink (RSSI_U) (in S107 and S108). The received signal strength indication for uplink (RSSI_U) is measured as follows. The signal received at the antenna is amplified to a low-noise level by a low noise amplifier (LNA) and is input to RFI_HF in LORA. The input signal is down-converted by a mixer, and subsequently, an intermediate frequency (IF) signal is analyzed to measure the received signal strength indication for uplink (RSSI_U).

The master unit 110 compares the ratio of the received signal strength indication for downlink (RSSI_D) to the received signal strength indication for uplink (RSSI_U) with the predetermined reference value R to determine whether or not an abnormality occurs in the distributed service antennas (in S109 and S110). For example, a ratio of a value of a transmission signal to a value of a reception signal is theoretically required to be constant. If the ratio significantly varies or if the ratio changes during operation, it may be determined that an abnormality occurs in the performance of any one of the distributed service antennas of the DAS or a problem occurs in the cable connection.

The master unit 110 transmits the diagnosis result to the monitoring server 140. The monitoring server 140 performs a Log analysis, statistical processing and visualization on the diagnosis result, and transmits the results to the administrator radio terminal 150 while opening the results over the Web (in S111 to S115). With this configuration, the administrator can access to the monitoring server 140 to monitor the state of the distributed service antennas of the DAS.

Here, the Log analysis is a process of analyzing the stage log of the antenna in time series to check the state of abnormality. The visualization is a process of displaying the current state of the antenna in the form of a dashboard using a monitoring dashboard such that the current state can be checked through the mobile web browser. That is, the dashboard-based visualization structure displays, in a mapping manner, the results obtained by combining the importance of data and the thinking process of the user, and provides a multilayer dashboard which is composed of multiple layers according to operating spaces and implements visualization in a mapping manner for an efficient information transmission. Furthermore, in the dashboard-based visualization, a position of an abnormal antenna is displayed on the dashboard such that a position where an abnormality occurs can be intuitively checked through the perception of the abnormality and the visualization of the abnormality-occurred position. Whether or not the abnormality occurs may be displayed using an alarm blink. Further, an abnormal situation checked by the Log analysis is automatically notified to the administrator radio terminal 150 set in advance. Therefore, according to an embodiment of the present disclosure, it is possible to develop a visualization service by collecting and aggregating the state data of the antennas, and allow the administrator to monitor and manage the states of the antennas through a cloud network at ordinary times.

Figure 8:
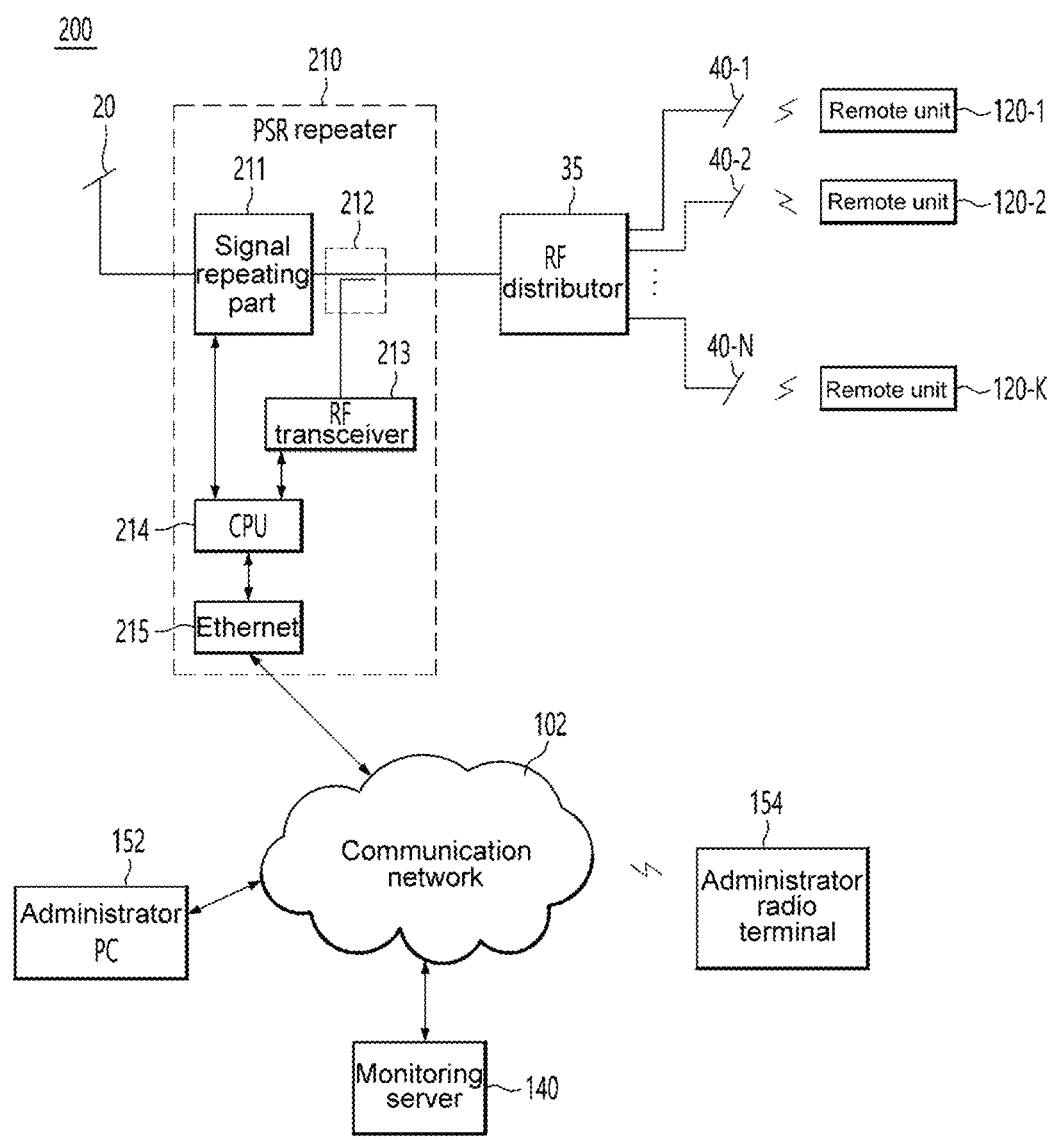
FIG. 8 is a schematic view illustrating an overall configuration of a distributed antenna monitoring apparatus for public safety radio network according to a second embodiment of the present disclosure.

FIG. 8 is a schematic view illustrating an overall configuration of a distributed antenna monitoring apparatus for public safety radio network according to a second embodiment of the present disclosure. FIG. 9 is a flowchart for explaining an operation procedure of the distributed antenna monitoring apparatus for public safety radio network according to the second embodiment of the present disclosure.

The second embodiment of the present disclosure differs from the first embodiment in that, in the second embodiment, the radio coupler 130 and the master unit 110 are incorporated in a public safety radio network (PSR) repeater 210 to simultaneously monitor the state of distributed service antennas and the state of the PSR repeater.

As illustrated in FIG. 8, a distributed antenna monitoring apparatus 200 according to the second embodiment of the present disclosure includes a donor antenna 20, the PSR repeater 210 having a master unit function incorporated therein, a radio frequency (RF) distributor 35, distributed service antennas 40-1 and 40-2, remote units 120-1 to 120-N connected to the distributed service antennas 40-1 to 40-N through radio links, respectively, a monitoring server 140 connected to the PSR repeater 210 through a communication network 102, an administrator PC 152 and an administrator radio terminal 154. The administrator PC 152 and the administrator radio terminal 154 will be collectively referred to sometimes as an administrator radio terminal 150. That is, in the second embodiment of the present disclosure, the PSR repeater 210 having an antenna monitoring function is provided by combining a stand-alone antenna monitoring apparatus with a PSR control board.

Referring to FIG. 8, the donor antenna 20 is a directional antenna connected to an external radio network. The PSR repeater 210 includes the radio coupler 130 and the master unit 110 incorporated therein to simultaneously monitor the states of the distributed service antennas 40-1 to 40-N and the state of the PSR repeater 210. The RF distributor 35 are connected between the PSR repeater 210 and the distributed service antennas 40-1 to 40-N through coaxial cables. The RF distributor 35 distributes a radio signal transmitted from the PSR repeater 210 and transmits the same to the distributed service antennas 40-1 to 40-N, and further combines radio signals received from the distributed service antennas 40-1 to 40-N and transmits the same to the PSR repeater 210.

The distributed service antennas 40-1 to 40-N, which are omnidirectional antennas that are dispersedly installed in each floor inside a building, transmit a monitoring radio signal received from the PSR repeater 210 to the remote units 120-1 to 120-K (collectively referred to sometimes as a remote unit 120) and transmit monitoring radio signals received from the remote units 120-1 to 120-K to the PSR repeater 210 through the RF distributor 35.

The PSR repeater 210 according to the second embodiment includes a signal repeating part 211 configured to transmit a radio signal for PSR received from the donor antenna 20 to the distributed service antennas 40-1 to 40-N, and further transmit a radio signal received from a radio antenna to the donor antenna 20, a radio coupler 212 configured to couple the monitoring radio signal to the distributed service antennas 40-1 to 40-N, a RF transceiver 213 configured to transmit and receive the monitoring radio signal, a master control part 214 composed of a CPU, and an Ethernet driver 215.

The radio coupler 212 couples the monitoring radio signal and transmits the same to the RF transceiver 213. The RF transceiver 213 transmits a radio signal having a diagnostic packet included therein to the distributed service antennas 40-1 to 40-N through the radio coupler 212. Further, the RF transceiver 213 receives a monitoring radio signal having a response packet included therein from each of the distributed service antennas 40-1 to 40-N, compares and analyzes a received signal strength indication for uplink (RSSI_U) and a received signal strength indication for downlink (RSSI_D) to monitor the state of each of the distributed service antennas 40-1 to 40-N.

In the second embodiment, as illustrated in FIG. 9, the distributed antenna monitoring apparatus 200 with the aforementioned configuration transmits a message between the administrator radio terminal 150, the monitoring server 140, the PSR repeater 210, and the remote unit 120.

Referring to FIG. 9, the PSR repeater 210 produces a diagnostic packet and transmits the same to the remote unit 120 through the radio coupler 212, the RF distributor 35, and the distributed service antennas 40-1 to 40-N (in S201 and S202).

The remote unit 120 receives the diagnostic packet, disassembles and analyzes the same to measure the received signal strength indication for downlink (RSSI_D) (in S203 and S204).

The remote unit 120 assembles a response packet having the received signal strength indication for downlink (RSSI_D), and transmits the assembled response packet with carried in a transmission time slot to the PSR repeater 210 through a respective one of the distributed service antennas 40-1 to 40-N, the RF distributor 35 and the radio coupler 212 (in S205 and S206).

The PSR repeater 210 receives the response packet from the remote unit 120, and disassembles and analyzes the same to measure the received signal strength indication for uplink (RSSI_U) (in S207 and S208).

The PSR repeater 210 compares a ratio of the received signal strength indication for downlink (RSSI_D) to the received signal strength indication for uplink (RSSI_U) with a predetermined reference value to determine whether or not an abnormality occurs in each of the distributed service antennas 40-1 to 40-N. Further, the PSR repeater 210 collects and analyzes a repeater detection signal provided from the signal repeating part 211 to determine whether or not an abnormality occurs in the PSR repeater 210 (in S209 to S211).

The PSR repeater 210 transmits the diagnosis results to the monitoring server 140. The monitoring server 140 performs a Log analysis, statistical processing and visualization on the diagnosis results, and transmits the results to the administrator radio terminal 150 while opening the results over the Web (in S212 to S216). With this configuration, the administrator can access to the monitoring server 140 to monitor the state of the distributed antenna monitoring apparatus.

As described above, in the distributed antenna monitoring apparatus according to the embodiments of the present disclosure, a communication mode using the RF transceiver with a frequency in the range of 850 to 1,050 MHz is employed. This makes it possible to reduce a signal attenuation and provide a remote service. In addition, a battery is used as a primarily power source and a lithium battery as a secondary battery having an Energy Harvest function is used as an auxiliary power source. The use of such two types of batteries makes it possible to implement a stable operation and maintain a use state for a prolonged period of time.

Furthermore, communication is established using an antenna. This makes it possible to monitor not only the characteristics of coaxial lines but also the characteristics of the antennas. Further, the RF transceiver of the master unit and the RF transceiver of the remote unit communicate with each other in a bidirectional communication. This makes it possible to measure the bidirectional characteristics of the antennas.

Although the technical spirit of the present disclosure has been described using embodiments illustrated in the accompanying drawings, it should be noted that various modifications, and equivalent variations can be devised by those skilled in the art to which the present disclosure pertains without departing from the technical spirit and scope of the present disclosure.

EXPLANATION OF REFERENCE NUMERALS

20: donor antenna
30,210: PSR repeater
35: RF distributor
40-1 to 40-N: service antenna
100, 200: distributed antenna monitoring apparatus
110: master unit
120, 120-1 to 120-K: remote unit
130: radio coupler
140: monitoring server
150: administrator radio terminal

What is claimed is:

1. A distributed antenna monitoring apparatus used for a public safety radio network,
wherein the public safety radio network includes:
a plurality of distributed service antennas dispersed in each floor in a building;
a repeater for public safety radio network connected to a donor antenna through a coaxial cable, and configured to transmit a radio signal received from the donor antenna to the plurality of distributed service antennas and transmit radio signals received from the plurality of distributed service antennas to the donor antenna; and
a radio frequency distributor connected between the repeater and the plurality of distributed service antennas through coaxial cables, and configured to distribute the radio signal transmitted from the repeater to the plurality of distributed service antennas, and combine the radio signals received from the plurality of distributed service antennas and transmit the combined radio signal to the repeater,
the distributed antenna monitoring apparatus comprising:
a radio coupler configured to couple first monitoring radio signals to be transmitted to the plurality of distributed service antennas, and couple a second monitoring radio signal to be received from each of the plurality of distributed service antennas;
a master unit configured to transmit the first monitoring radio signals having a diagnostic packet included therein to the plurality of distributed service antennas through the radio coupler, and receive the second monitoring radio signal having a response packet included therein from each of the plurality of distributed service antennas to measure a received signal strength indication for uplink (RSSI_U), analyze the measured received signal strength indication for uplink (RSSI_U) and a received signal strength indication for downlink (RSSI_D) to monitor a state of each of the plurality of distributed service antennas;
a plurality of remote units respectively connected to the plurality of distributed service antennas through radio links, and each configured to receive the first monitoring radio signal having the diagnostic packet included therein transmitted from the master unit to measure the received signal strength indication for downlink (RSSI_D), assemble the response packet having the measured received signal strength indication for downlink (RSSI_D) and transmit the second monitoring radio signal having the assembled response packet to the master unit; and
a monitoring server connected to the master unit though a communication network and configured to perform a statistical processing and visualization on information about the state of each of the plurality of distributed service antennas such that the information is monitored on an administrator radio terminal.

2. The distributed antenna monitoring apparatus of claim 1, wherein the radio coupler and the master unit are incorporated in the repeater for the public safety radio network to simultaneously monitor the state of each of the plurality of distributed service antennas and a state of the repeater.

3. The distributed antenna monitoring apparatus of claim 1, wherein the master unit includes:
an Ethernet driver configured to communicate with the monitoring server in a TCP/IP manner;
a master control part configured to produce a diagnostic payload, analyze a response payload to determine whether or not an abnormality occurs, and transmit antenna monitoring information to the monitoring server through the Ethernet driver;
a radio frequency transceiver configured to assemble the diagnostic payload to the diagnostic packet corresponding to a communication protocol, disassemble the response packet to extract the response payload therefrom under a control of the master control part, transmit the diagnostic packet as the first monitoring radio signal, and extract the response packet from the second monitoring radio signal input thereto; and
a radio frequency splitter configured to separate or combine the first monitoring radio signals or the second monitoring signal.

4. The distributed antenna monitoring apparatus of claim 1, wherein the remote unit includes:
a radio frequency transceiver configured to receive the first monitoring radio signal to extract the diagnostic packet from the first monitoring radio signal, transmit the second monitoring radio signal having the response packet included therein, disassemble the diagnostic packet to extract the diagnostic payload therefrom, and assemble the response payload to the response packet corresponding to a communication protocol;
a remote control part configured to analyze the diagnostic payload to measure the received signal strength indication for downlink (RSSI_D), produce the response payload having the received signal strength indication for downlink (RSSI_D) and transmit the produced response payload to the protocol processor; and
a power source configured to supply power required for the remote unit.

5. The distributed antenna monitoring apparatus of claim 2, wherein the master unit includes:
an Ethernet driver configured to communicate with the monitoring server in a TCP/IP manner;
a master control part configured to produce a diagnostic payload, analyze a response payload to determine whether or not an abnormality occurs, and transmit antenna monitoring information to the monitoring server through the Ethernet driver;
a radio frequency transceiver configured to assemble the diagnostic payload to the diagnostic packet corresponding to a communication protocol, disassemble the response packet to extract the response payload therefrom under a control of the master control part, transmit the diagnostic packet as the first monitoring radio signal, and extract the response packet from the second monitoring radio signal input thereto; and
a radio frequency splitter configured to separate or combine the first monitoring radio signals or the second monitoring signal.

6. The distributed antenna monitoring apparatus of claim 2, wherein the remote unit includes:
a radio frequency transceiver configured to receive the first monitoring radio signal to extract the diagnostic packet from the first monitoring radio signal, transmit the second monitoring radio signal having the response packet included therein, disassemble the diagnostic packet to extract the diagnostic payload therefrom, and assemble the response payload to the response packet corresponding to a communication protocol;
a remote control part configured to analyze the diagnostic payload to measure the received signal strength indication for downlink (RSSI_D), produce the response payload having the received signal strength indication for downlink (RSSI_D) and transmit the produced response payload to the protocol processor; and
a power source configured to supply power required for the remote unit.

7. A distributed antenna monitoring method used in a public safety radio network, the method comprising:
producing and transmitting, by a master unit, a diagnostic packet to a remote unit;
disassembling and analyzing, by the remote unit, the diagnostic packet to measure a received signal strength indication for downlink (RSSI_D);
producing, by the remote unit, a response packet having the received signal strength indication for downlink (RSSI_D);
transmitting, by the remote unit, the response packet to the master unit through a service antenna of distributed service antennas;
disassembling, by the master unit, the response packet to measure a received signal strength indication for uplink (RSSI_U);
analyzing, by the master unit, the received signal strength indication for downlink (RSSI_D) and a received signal strength indication for uplink (RSSI_U) to determine whether or not an abnormality occurs in the service antenna;
transmitting, by the master unit, an antenna diagnosis result to a monitoring server; and
allowing the monitoring server to perform a statistical processing and visualization on antenna diagnosis information and to notify an administrator of the antenna diagnosis information.

\* \* \* \* \*